(12) United States Patent  (10) Patent No.: US 8,234,503 B2
Gassoway  (45) Date of Patent: Jul. 31, 2012

(54) METHOD AND SYSTEMS FOR COMPUTER SECURITY

(75) Inventor: Paul Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 1142 days.

(21) Appl. No.: 11/132,613

(22) Filed: May 18, 2005

(65) Prior Publication Data
US 2005/0262561 A1    Nov. 24, 2005

Related U.S. Application Data

(60) Provisional application No. 60/572,656, filed on May 19, 2004.

(51) Int. Cl.
H04L 9/32   (2006.01)
(52) U.S. Cl. .......................................... 713/188; 726/22
(58) Field of Classification Search .................. 380/200, 380/30; 713/192, 168, 182; 726/4, 13, 30, 726/24; 719/311; 709/12, 14
See application file for complete search history.

(56) References Cited

U.S. PATENT DOCUMENTS

| | | | | |
|---|---|---|---|---|
| 2003/0212926 A1* | 11/2003 | Bhat et al. | | 714/43 |
| 2004/0015728 A1* | 1/2004 | Cole et al. | | 713/201 |
| 2004/0025044 A1* | 2/2004 | Day | | 713/200 |
| 2004/0083408 A1* | 4/2004 | Spiegel et al. | | 714/43 |
| 2004/0250124 A1* | 12/2004 | Chesla et al. | | 713/201 |
| 2005/0060426 A1* | 3/2005 | Samuels et al. | | 709/238 |
| 2005/0229244 A1* | 10/2005 | Khare et al. | | 726/13 |

OTHER PUBLICATIONS

International Search Report for application PCT/US2005/017442 (6 pages), Sep. 5, 2005.
Written Opinion of the International Searching Authority for application PCT/US2005/017442 (5 pages), Sep. 5, 2005.
XP-002342234; Early Detection of Internet Worm Activity by Metering ICMP Destination Unreachable Messages; George Bakos et al.; ISTS Dartmouth College, Hanover, HH, pp. 33 to 42, 2002.
XP-002342235; Rapid Detection of Worms Using ICMP-T3 Analysis; Robert S. Gray, et al.; Institute for Security Technology Studies, Thayer School of Engineering, Dartmouth College, Hanover, NH; pp. 89 to 101, 2004.
XP-002285507; Internet Control Message Protocol (ICMPv6) for the Internet Protocol Version 6 (IPv6) Specification; A. Conta Lucent, et al.; Cisco Systems; pp. 1 to 18 Dec. 1998.

* cited by examiner

Primary Examiner — Vivek Srivastava
Assistant Examiner — Nega Woldemariam
(74) Attorney, Agent, or Firm — Baker Botts L.L.P.

(57) ABSTRACT

A method for maintaining computer security includes detecting a connection failure, storing information relating to the connection failure, determining a number of connection failures and determining whether a machine is infected with malicious code based on the determined number of connection failures.

24 Claims, 6 Drawing Sheets

METHOD AND SYSTEMS FOR COMPUTER SECURITY

REFERENCE TO RELATED APPLICATION

This application is based on and claims the benefit of Provisional Application Ser. No. 60/572,656 filed May 19, 2004, the entire contents of which are herein incorporated by reference.

BACKGROUND

1. Technical Field

The present disclosure relates generally to security and, more particularly, to a method and system for computer security.

2. Description of the Related Art

With the growth of the Internet, the increased use of computers and the exchange of information between individual users has posed a threat to the security of computers. Computer security attempts to ensure the reliable operation of networking and computing resources and attempts to protect information on the computer or network from unauthorized access or disclosure. Computer system(s) as referred to herein include(s) individual computers, servers, computing resources, networks, etc. Among the various security threats that present increasingly difficult challenges to the secure operation of computer systems are computer viruses, Trojan horses, worms, etc. Computer viruses are programs that can infect other programs by modifying them in such a way as to include a copy of themselves. A Trojan horse is an executable program that appears to be desirable but is merely disguised as "friendly" and actually contains harmful code, allowing an attacker to come in through the "back door" and perform malicious actions on the computer system.

Worms are independent programs that are capable of reproducing themselves, spreading from machine to machine, usually across network connections. Unlike computer viruses, worms do not need to infect other programs and do not need any user action to spread. Worms exist as a separate code in memory and spread silently on their own from computer system to computer system (instead of just spreading within one system). Worms are thus self propagating pieces of code designed to copy themselves from one computer system to another, trying to infect as many machines as possible, clogging up communications between, for example, computer systems and the Internet.

Email viruses use email to propagate from computer system to computer system. Infection of an email virus can occur when an attachment is opened that contains the virus. The attachment may appear to be harmless to the user because it might be sent from a contact that the user knows. However, the contact's email client, infected by the virus, may have sent copies of itself to the email addresses listed in the contact's address book. Thus, when a user opens the attachment that contains the virus, its own email client becomes infected and also starts sending the virus to the contacts in that user's address book. This process continues, causing the virus to spread throughout the Internet at a high rate, slowing down local area networks and the Internet.

System administrators responsible for the efficient operation of computer networks may utilize scanning programs in order to protect their computer systems from security threats such as worms, viruses, etc. Scanning programs operate to protect from the spread of these threats by detecting the threat and isolating and/or removing the malicious code. Scanning programs may contain a list of previously defined threat signatures or definitions, containing the binary patterns or signatures of the threat. The scanning programs scan the various files of a system looking for a match to a particular threat's signature. If a threat is detected, the user may be notified and further steps may be taken to remove or isolate the malicious code. However, conventional scanning products may not provide comprehensive protection against these threats. Scanning software may detect the threats present in the system, but it does nothing to prevent them from infiltrating the system in the first place. The scanning software should be continuously updated in order to be effective in detecting new and modified threats. This not only proves to be a very tedious and time consuming task for computer users, but also may not happen often enough to provide adequate safeguards against new threats. Even if a user is diligent about updating the signature database (e.g., weekly), this still leaves a large window of opportunity for new worms to propagate and infect a large number of machines. Malicious code can therefore spread very quickly and infect many computer systems before being detected.

Accordingly, it would be beneficial to have methods and systems for providing a quick and effective way of ensuring that exploitation of system vulnerabilities will not come to light.

SUMMARY

A method for maintaining computer security comprises detecting a connection failure, storing information relating to the connection failure, determining a number of connection failures and determining whether a machine is infected with malicious code based on the determined number of connection failures.

A system for maintaining computer security comprises a system for detecting a connection failure, a system for storing information relating to the connection failure, a system for determining a number of connection failures and a system for determining whether a machine is infected with malicious code based on the determined number of connection failures.

A computer recording medium including computer executable code for maintaining computer security comprises code for detecting a connection failure, code for storing information relating to the connection failure in a database, code for determining a number of connection failures and code for determining whether a machine is infected with malicious code based on the determined number of connection failures.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides tools (in the form of methodologies, apparatuses, and systems) for maintaining computer security. The tools may be embodied in one or more computer programs stored on a computer readable medium or program storage device and/or transmitted via a computer network or other transmission medium.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Figure 1:
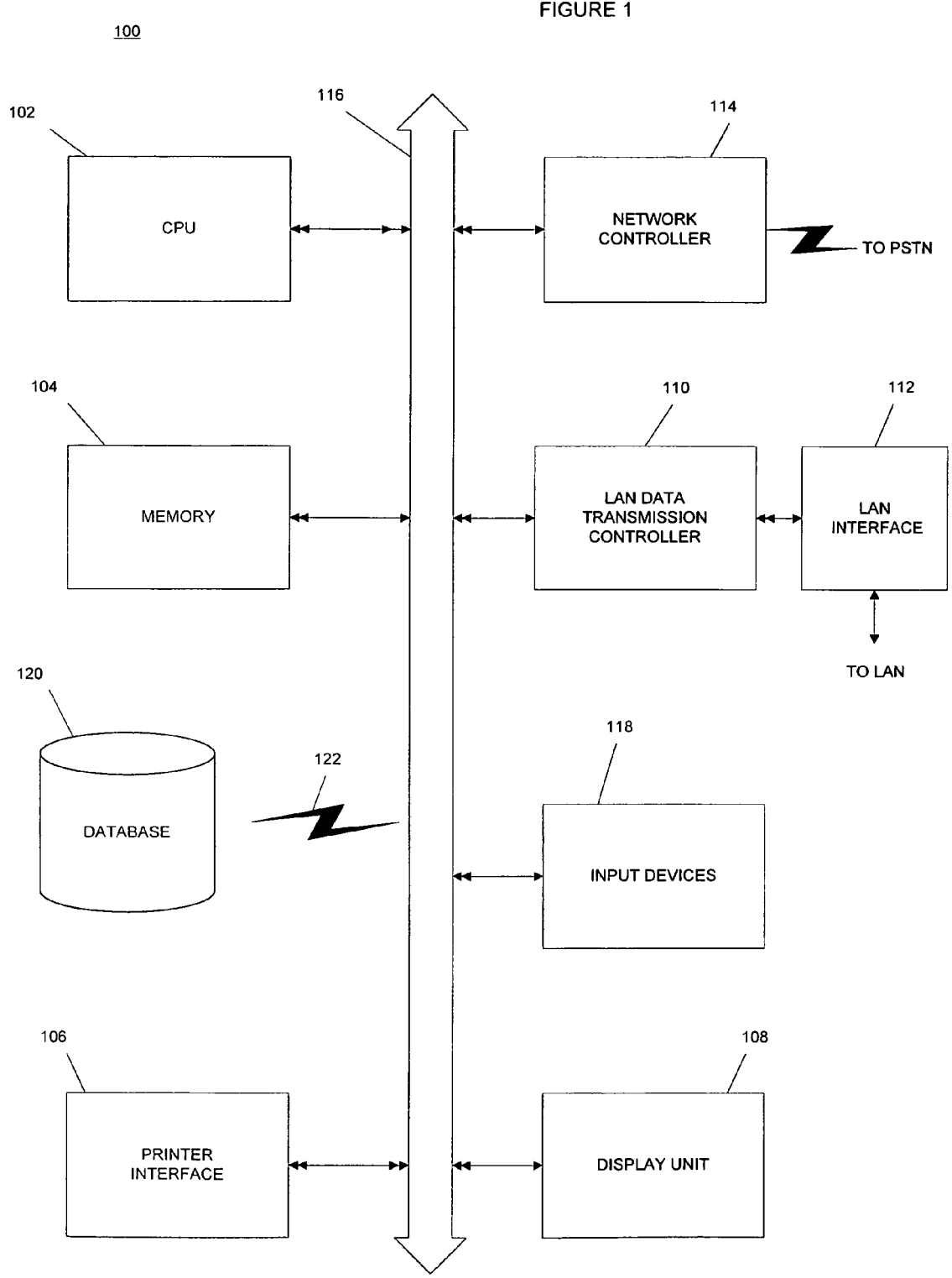
FIG. 1 shows a block diagram of an exemplary computer system capable of implementing the method and system of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Figure 2:
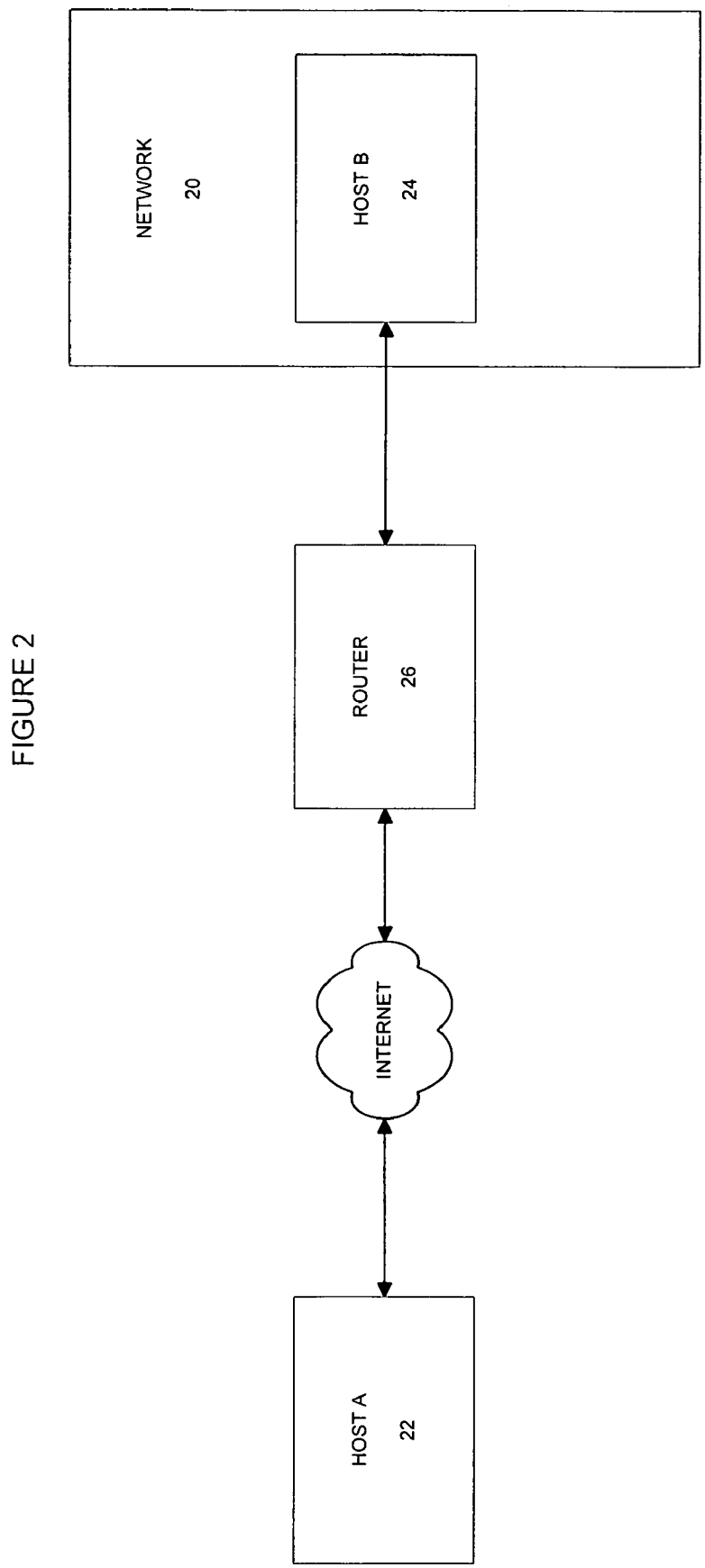
FIG. 2 is a block diagram for describing communication between hosts.

FIG. 2 shows an example of a system in which host A 22 is sending data to a host B 24 on network 20. Upon receipt of a frame from host A 22, router 26 begins processing it, discarding frame encapsulation, making routing decisions and preparing to transmit it to the destination host (host B 24). To prepare an appropriate frame header, router 26 queries the network 20 by broadcasting an Address Resolution Protocol (ARP) address request for host B 24. If host B 24 is available, it will respond with an ARP reply which includes its IP address. Using this information, router 26 then prepares the frame header and delivers the packet to host B 24. If for some reason host B 24 is not available (e.g., it does not exist or is not listening), router 26 will not receive an ARP reply. In this case, router 26 responds to host A 22 by encapsulating a portion of the original datagram in an ICMP destination unreachable message (e.g., an ICMP Type 3 message) indicating that host B 24 is not available and returns it to host A 22. The encapsulated information may include, for example, the source IP address and the intended destination IP address as well as other information.

One common characteristic among various types of worms is that they often attempt to replicate by sending copies of themselves to random IP addresses sometimes using a sequential or pseudo-random selection process. Since these IP addresses are random, messages will be sent to many IP addresses not associated with an active machine. For example, there may be no machine at the IP address or the machine at the IP address may not be listening. Accordingly, many ICMP destination unreachable messages will be returned to the host from which the messages originated (e.g., the machine infected with a worm.)

According to an embodiment of the present disclosure, the connection failures identified by the ICMP destination unreachable messages are stored and used to determine when a worm has entered a machine and is attempting to propagate. The system may passively monitor for ICMP destination unreachable messages and record the source and destination addresses of the ICMP destination unreachable messages. If a single destination address has received destination unreachable messages from a large number of devices, it is likely that the machine identified by the destination address is infected with a worm.

Figure 3:
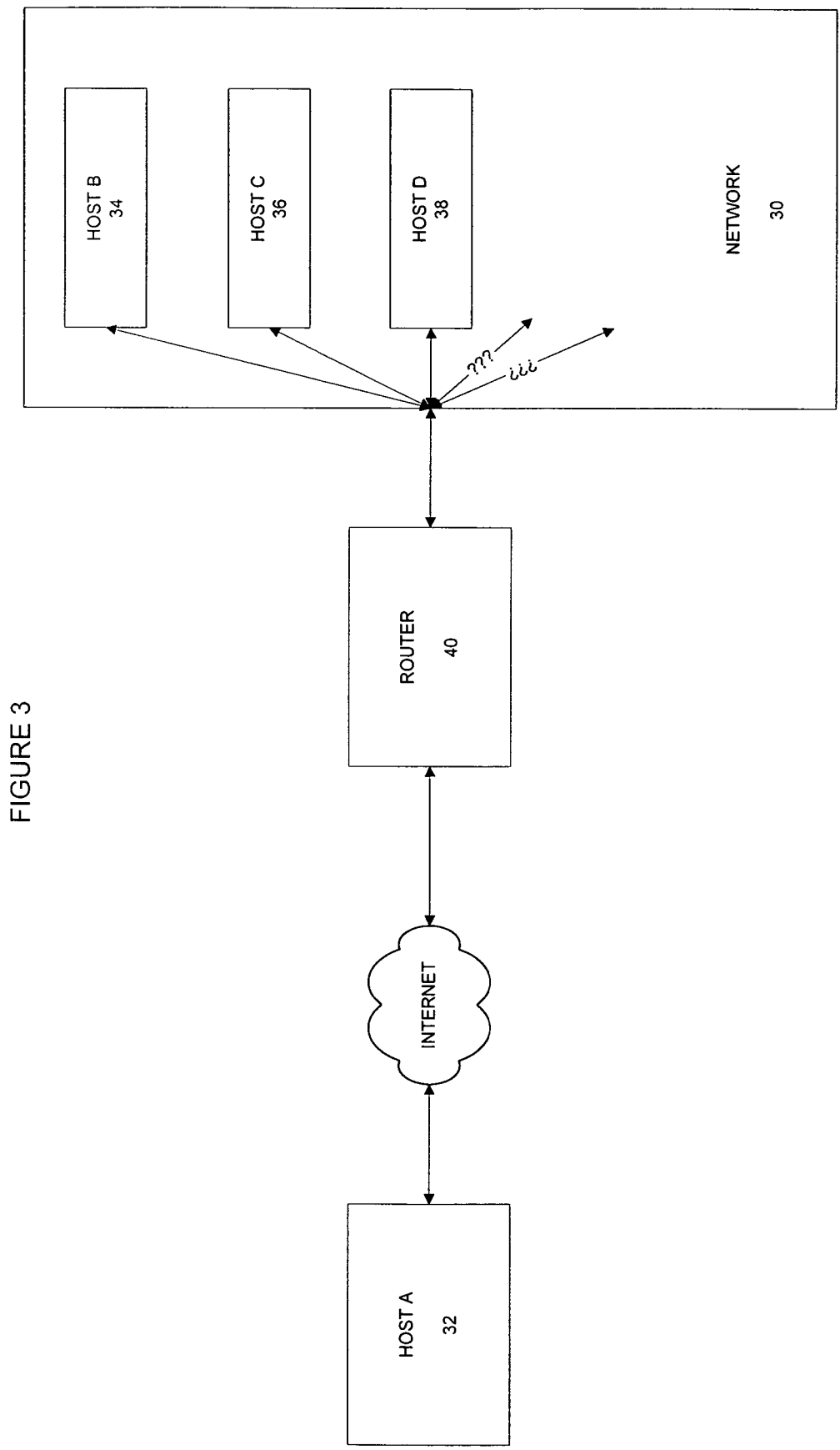
FIG. 3 is a block diagram illustrating a system for maintaining computer security, according to an embodiment of the present disclosure.

An example of a worm infected machine (host A 22) attempting to spread the worm is shown in FIG. 3. Host A 32 is infected with a particular type of worm, which attempts to connect to random IP addresses (e.g., host B 34, host C 36, host D 38, etc. as well as hosts that do not exist on network 30.) For ease of description, only one router is shown. Of course, in reality, many routers and hosts may be involved when the worm is attempting to propagate. Upon receipt of the frames from host A 32, router 40 processes them, discarding frame encapsulation, making routing decisions and preparing to transmit them to the destination hosts. To prepare an appropriate frame header, router 40 queries the network 30 by broadcasting Address Resolution Protocol (ARP) address requests for hosts B, C, D, etc. as well as for the nonexistent hosts. If a host is available, it will respond with an ARP reply which includes its IP address. In this example, hosts B-D, etc. will return ARP replies. However, the non-existent or non-listening machines will not return replies. Router 40 then prepares the frame header and delivers the packets to hosts B, C, D, etc. However, for those hosts not available, router 40 (source) will prepare an ICMP destination unreachable message informing host A 32 (destination) that the host at the source address is unreachable. According to an embodiment of the present disclosure, the number of ICMP destination unreachable messages can be monitored and used to determine whether a worm is present on host A 32. The monitoring may be performed by a machine (not shown) passively listening to traffic to/from host A, or may be performed by host A itself. For example, Host A, may store information indicating the number of ICMP destination unreachable messages it has received. When the number reaches a defined level, host A can take one or more actions including, but not limited to, notifying a user that a worm may be present, automatically isolating the computer and/or automatically shutting the computer down, etc.

Figure 4:
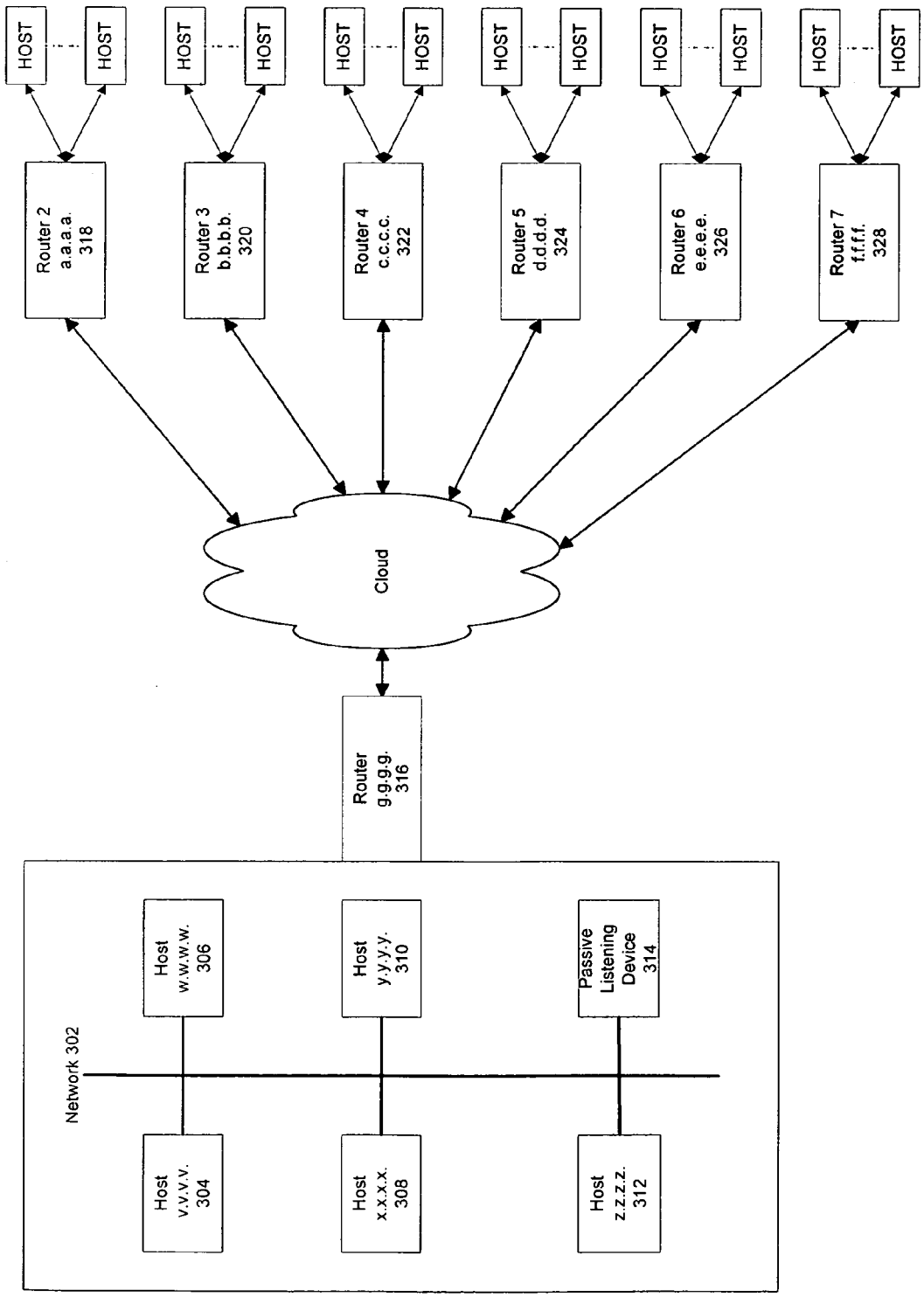
FIG. 4 shows a block diagram illustrating a system for maintaining computer security, according to an embodiment of the present disclosure.
Figure 5:
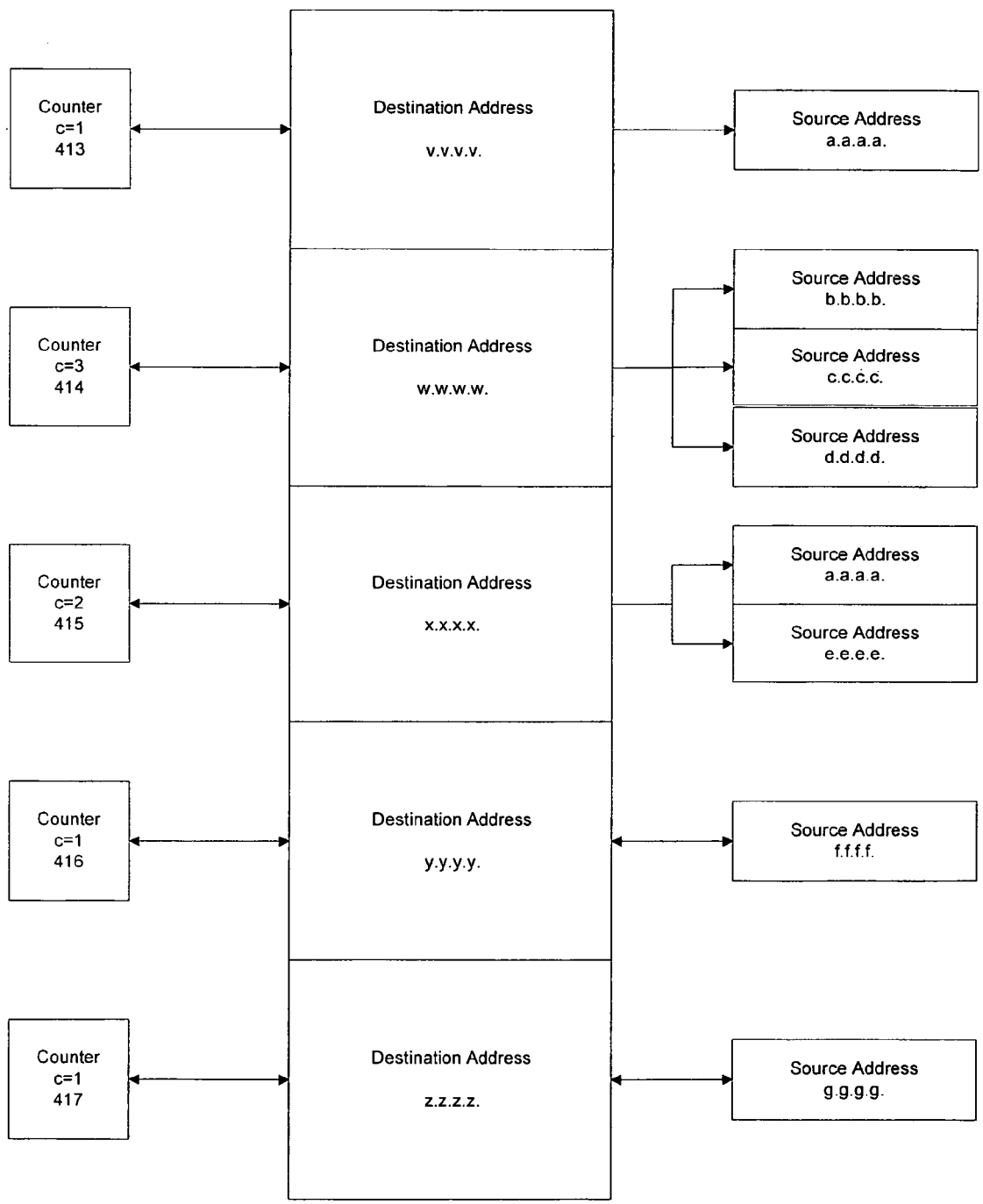
FIG. 5 shows a block diagram illustrating the storage of destination and source addresses in a database, according to an embodiment of the present disclosure.

FIG. 4 is a block diagram illustrating a system for maintaining computer security, according to another embodiment of the present disclosure. In this example, hosts 304-312 on network 302 are attempting to send messages to one or more hosts reachable by routers 318-328. Passive listening device 314 monitors for destination unreachable messages being returned to machines on network 302. FIG. 5 depicts examples of information stored in a database (not shown) by passive listening device 314, for explaining various aspects of the present disclosure.

Figure 6:
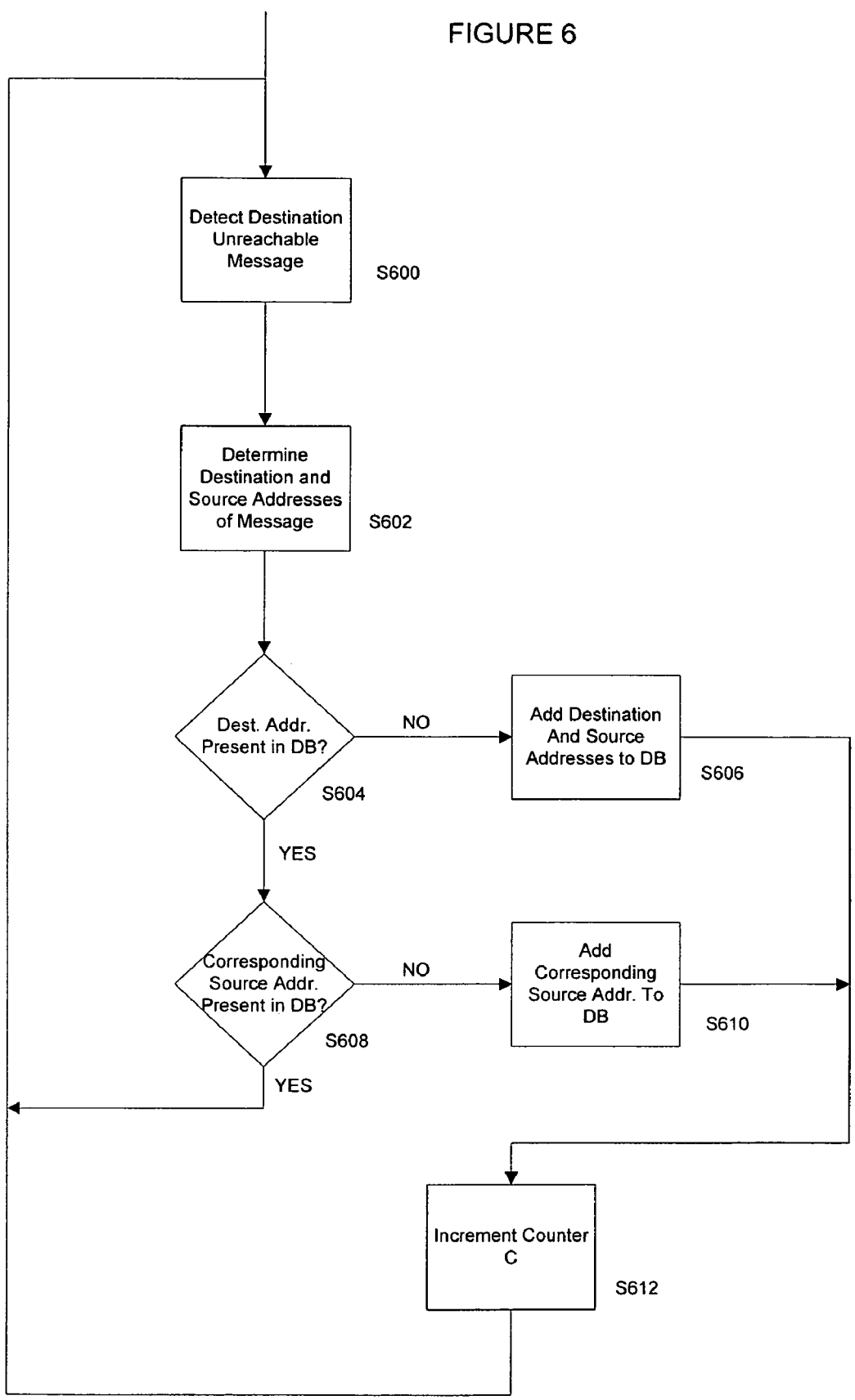
FIG. 6 is a flow chart for describing a system for maintaining computer security according to an embodiment of the present disclosure.

FIG. 6 is a flow chart for describing various steps performed by passive listening device 314. In Step S600, the system detects a destination unreachable message. The system then determines the destination and source addresses of the message (Step S602). The system then determines whether the destination address is present in the database. If the destination address is not in the database (No, Step S604), the destination and source addresses are then added to the database (Step S606). A counter is associated with each destination address in the database. Each time a source is added to a corresponding destination address, the counter is incremented. In this case, the counter is incremented (Step S612) and the process returns to Step S600. If the destination address of the message is in the database (Yes, Step S604), a determination is made whether the source address of the message is in database and associated with the corresponding destination address (Step S608). It the associated source address is not in the database, the source is added to the database and associated with the corresponding destination address (Step S610), and the counter C is incremented (Step S612) and the process returns to Step S600. If the corresponding source address is in the database (Yes, Step S608), the process returns to Step S600.

An example of the operation of the system shown in FIGS. 4-6 will now be described. Host 304 (address v.v.v.v.) has attempted to send a message by presenting a datagram to router 318 (address a.a.a.a.). The machine for which the message is destined is not there or is otherwise not available. Accordingly, router 318 has returned an ICMP destination unreachable message to host 304, the message having a source address of a.a.a.a. and a destination address of v.v.v.v. Passive listening device 314, listening on network 302, detects the message and stores the destination address v.v.v.v. along with corresponding source address a.a.a.a. and increments counter 413 to C=1.

Host 306 (address w.w.w.w.) has attempted to send a message by presenting a datagram to router 320 (address b.b.b.b.). The machine for which the message is destined is not there or is otherwise not available. Accordingly, router 320 has returned an ICMP destination unreachable message to host 306, the message having a source address of b.b.b.b. and a destination address of w.w.w.w. Passive listening device 314, listening on network 302, detects the message and stores the destination address w.w.w.w. along with corresponding source address b.b.b.b. and increments counter 414 to C=1.

Host 306 (address w.w.w.w.) has also attempted to present another datagram to router 322 (address c.c.c.c.). The machine for which the message is destined is not there or is otherwise not available. Accordingly, router 322 has returned an ICMP destination unreachable message to host 306, the message having a source address of c.c.c.c. and a destination address of w.w.w.w. Passive listening device 314, listening on network 302, detects the message and, after determining that destination address w.w.w.w. is already in the database, stores the corresponding source address c.c.c.c. and increments counter 414 to C=2.

Host 306 (address w.w.w.w.) has also attempted to send a message by presenting another datagram router 324 (address d.d.d.d.). The machine for which the message is destined is not there or is otherwise not available. Accordingly, router 324 has returned an ICMP destination unreachable message to host 306, the message having a source address of d.d.d.d. and a destination address of w.w.w.w. Passive listening device 314, listening on network 302, detects the message and, after determining that destination address w.w.w.w. is already in the database, stores the corresponding source address d.d.d.d. and increments counter 414 to C=3.

Host 308 (address x.x.x.x.) has attempted to send a message by presenting a datagram to router 318 (address a.a.a.a.). The machine for which the message is destined is not there or is otherwise not available. Accordingly, router 318 has returned an ICMP destination unreachable message to host 308, the message having a source address of a.a.a.a. and a destination address of x.x.x.x. Passive listening device 314, listening on network 302, detects the message and stores the destination address x.x.x.x. along with corresponding source address a.a.a.a. and increments counter 415 to C=1.

Host 308 (address x.x.x.x.) has also attempted to send a message by presenting another datagram to router 326 (address e.e.e.e.). The machine for which the message is destined is not there or is otherwise not available. Accordingly, router 326 has returned an ICMP destination unreachable message to host 308, the message having a source address of e.e.e.e. and a destination address of x.x.x.x. Passive listening device 314, listening on network 302, detects the message and, after determining that destination address x.x.x.x. is already in the database, stores the corresponding source address e.e.e.e. and increments counter 415 to C=2.

Host 310 (address y.y.y.y.) has attempted to send a message by presenting a datagram to router 328 (address f.f.f.f.). The machine for which the message is destined is not there or is otherwise not available. Accordingly, router 328 has returned an ICMP destination unreachable message to host 310, the message having a source address of f.f.f.f. and a destination address of y.y.y.y. Passive listening device 314, listening on network 302, detects the message and stores the destination address y.y.y.y. along with corresponding source address f.f.f.f. and increments counter 416 to C=1.

Host 312 (address z.z.z.z.) has attempted to send a message by presenting a datagram to an unreachable network. In this case, router 316 (address g.g.g.g.) returns a network unreachable message to host 312, the message having a source address g.g.g.g. and a destination address z.z.z.z. Passive listening device 314, listening on network 302, detects the message and stores the destination address z.z.z.z. along with corresponding source address g.g.g.g. and increments counter 417 to C=1.

This process continues, populating the database with the source and destination address information of the destination unreachable messages received across network 302.

As noted above, if the destination address is already in the database, the system checks to see whether the corresponding source address is already associated with the destination address. If the destination address is not already in the database, the corresponding source address is added to the database for that destination address. On the other hand, if the corresponding source address is already associated with the destination address, another entry can be added for it and/or the corresponding counter can be incremented.

Periodically, passive listening device 314 can review the database. If there are a large number of source addresses associated with a single destination address, as indicated by the counter, then it is likely that the machine identified by the destination address is infected with a worm. This machine can then be disconnected until signatures that can isolate and remove the worm become available.

According to various embodiments of the present disclosure, corresponding information, such as timestamp information, destination port for a connection failure information, etc.

may also be provided for each source address stored in the database. For example, a time (actual time and/or date) indicating when the entry (destination address and/or source address) was made in the database can be included in the database. The system can be arranged so that it will periodically review the database and remove entries that have been there for a long period of time. If after removal a destination address still has too many corresponding source addresses, then the destination address can be reported as a possibly infected machine. The corresponding information can also help to identify possible infections and the services that the infections exploit. For example, based on the destination port of the source address, it can be determined which service an alleged worm seems to be targeting.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for maintaining computer security, comprising:
    detecting a connection failure, wherein a potentially-infected machine attempts to connect to a target machine through a router, and wherein the connection failure is identified by a ICMP destination unreachable message, and wherein the ICMP destination unreachable message comprises a destination address and a corresponding source address, the destination address identifying the potentially-infected machine;
    storing information relating to the connection failure with information relating to previous connection failures, the stored information including, for each destination address, a timestamp, a corresponding source address, and a destination port for the corresponding source address;
    removing from storage at least a portion of the information relating to the previous connection failures if it is determined that the at least a portion of the information relating to the previous connection failures has been stored for a predetermined period of time;
    determining a number of stored connection failures;
    determining whether a machine is potentially infected with malicious code based on the determined number of stored connection failures; and
    identifying an infection and a targeted service based on the stored information in response to determining that a machine is potentially infected with malicious code.

2. The method of claim 1, wherein the ICMP destination unreachable message comprises the destination address and the corresponding source address, the source address identifying the router that sent the ICMP destination unreachable message.

3. The method of claim 2, wherein the corresponding source address identifies the router that attempted a connection for which the connection failure occurred.

4. The method of claim 2, wherein storing the information relating to the connection failure comprises determining whether the destination address is already stored.

5. The method of claim 4, further comprising determining whether the corresponding source address is already stored if the destination address is already stored.

6. The method of claim 5, wherein the corresponding source address is stored only if it is determined that the corresponding source address is not already stored.

7. The method of claim 6, wherein removing at least a portion of the information comprises determining how long a corresponding source address has been stored and removing the corresponding source address if it is determined that the corresponding source address has been stored for a predetermined period of time.

8. The method of claim 7, wherein a counter is incremented for each corresponding source address that is stored and decremented for each source address that is removed.

9. A system for maintaining computer security, comprising:
    a processor; and
    a computer recording medium including computer executable code readable by a computer, embodying a program of instruction executable by the processor, the computer executable code operable to execute:
        a system for detecting a connection failure, wherein a potentially-infected machine attempts to connect to a target machine through a router, and wherein the connection failure is identified by a ICMP destination unreachable message, and wherein the ICMP destination unreachable message comprises a destination address and a corresponding source address, the destination address identifying the potentially-infected machine;
        a system for storing information relating to the connection failure with information relating to previous connection failures, the stored information including, for each destination address, a timestamp, a corresponding source address, and a destination port for the corresponding source address;
        a system for removing from storage at least a portion of the information relating to the previous connection failures if it is determined that the at least a portion of the information relating to the previous connection failures has been stored for a predetermined period of time;
        a system for determining a number of stored connection failures;
        a system for determining whether a machine is potentially infected with malicious code based on the determined number of stored connection failures; and
        a system for identifying an infection and a targeted service based on the stored information in response to determining that a machine is potentially infected with malicious code.

10. The system of claim 9, wherein the ICMP destination unreachable message comprises the destination address and the corresponding source address, the source address identifying the router that sent the ICMP destination unreachable message.

11. The system of claim 10, wherein the corresponding source address identifies the router that attempted a connection for which the connection failure occurred.

12. The system of claim 10, wherein storing the information relating to the connection failure comprises determining whether the destination address is already stored.

13. The system of claim 12, further comprising a system for determining whether the corresponding source address is already stored if the destination address is already stored.

14. The system of claim 13, wherein the corresponding source address is stored only if it is determined that the corresponding source address is not already stored.

15. The system of claim 14, wherein the system for removing from storage at least a portion of the information comprises a system for determining how long a corresponding source address has been stored and removing the corresponding source address if it is determined that the corresponding source address has been stored for a predetermined period of time.

16. The system of claim 15, wherein a counter is incremented for each corresponding source address that is stored and decremented for each source address that is removed.

17. A non-transitory computer recording medium including computer executable code for maintaining computer security, comprising: code for detecting a connection failure, wherein a potentially-infected machine attempts to connect to a target machine through a router, and wherein the connection failure is identified by a ICMP destination unreachable message, and wherein the ICMP destination unreachable message comprises a destination address and a corresponding source address, the destination address identifying the potentially-infected machine; code for storing information relating to the connection failure in a database with information relating to previous connection failures, the stored information including, for each destination address, a timestamp, a corresponding source address, and a destination port for the corresponding source address; code for removing from the database at least a portion of the information relating to the previous connection failures if it is determined that the at least a portion of the information relating to the previous connection failures has been stored for a predetermined period of time code for determining a number of connection failures stored in the database; code for determining whether a machine is potentially infected with malicious code based on the determined number of connection failures stored in the database; and code for identifying an infection and a targeted service based on the stored information in response to determining that a machine is potentially infected with malicious code.

18. The non-transitory computer recording medium of claim 17, wherein the ICMP destination unreachable message comprises the destination address and the corresponding source address, the source address identifying the router that sent the ICMP destination unreachable message.

19. The non-transitory computer recording medium of claim 18, wherein the corresponding source address identifies the router that attempted a connection for which the connection failure occurred.

20. The non-transitory computer recording medium of claim 18, wherein the code for storing the information relating to the connection failure comprises code for determining whether the destination address is already stored.

21. The non-transitory computer recording medium of claim 20, further comprising code for determining whether the corresponding source address is already stored if the destination address is already stored.

22. The non-transitory computer recording medium of claim 21, wherein the corresponding source address is stored only if it is determined that the corresponding source address is not already stored.

23. The non-transitory computer recording medium of claim 22, wherein the code for removing from the database at least a portion of the information comprises code for determining how long a corresponding source address has been stored and removing the corresponding source address if it is determined that the corresponding source address has been stored for a predetermined period of time.

24. The non-transitory computer recording medium of claim 23, wherein a counter is incremented for each corresponding source address that is stored and decremented for each source address that is removed.

* * * * *